United States Patent
Cai et al.

(10) Patent No.: US 8,744,471 B1
(45) Date of Patent: Jun. 3, 2014

(54) SYSTEMS AND METHODS OF CATEGORIZED ALLOCATION OF RADIO RESOURCES

(75) Inventors: Zheng Cai, Fairfax, VA (US); Arun Manroa, Herndon, VA (US); Yaojun Sun, South Riding, VA (US)

(73) Assignee: Nextel Communications Inc., Reston, VA (US)

( * ) Notice: Subject to any disclaimer, the term of this patent is extended or adjusted under 35 U.S.C. 154(b) by 1452 days.

(21) Appl. No.: 12/118,018

(22) Filed: May 9, 2008

(51) Int. Cl.
*H04W 72/00* (2009.01)

(52) U.S. Cl.
USPC .................. 455/452.2; 455/450; 455/452.1; 455/453; 455/454; 370/395.41

(58) Field of Classification Search
CPC . H04W 28/04; H04W 72/04; H04W 72/0446; H04W 84/08; H04W 48/08; H04W 76/02; H04W 24/00; H04L 12/5693; H04L 2012/5629; H04L 47/10; H04Q 11/0478
USPC .................. 455/450, 452.1, 452.2, 453, 454; 370/395.4, 395.41–395.43, 329, 330, 370/341, 431, 468
See application file for complete search history.

(56) References Cited

U.S. PATENT DOCUMENTS

| | | | |
|---|---|---|---|
| 2003/0081626 A1* | 5/2003 | Naor et al. ................. | 370/431 |
| 2007/0060178 A1* | 3/2007 | Gorokhov et al. ........... | 455/506 |
| 2007/0064604 A1* | 3/2007 | Chen et al. ................. | 370/230 |
| 2007/0230428 A1* | 10/2007 | Seki et al. ................. | 370/341 |
| 2008/0144525 A1* | 6/2008 | Crockett et al. ............ | 370/254 |
| 2008/0151751 A1* | 6/2008 | Ponnuswamy et al. ....... | 370/232 |
| 2008/0205267 A1* | 8/2008 | El Barachi et al. .......... | 370/230 |
| 2009/0245188 A1* | 10/2009 | Fukuoka et al. ............ | 370/329 |

* cited by examiner

*Primary Examiner* — Wayne Cai

(57) ABSTRACT

Systems and methods of allocating radio resources are provided. The systems and methods involve assigning each of a plurality of mobile stations to one of a plurality of categories, wherein each of the plurality of categories is associated with a different resource allocation scheme. An amount of available radio resources is allocated to each of the plurality of categories. An amount radio resources assigned to each category is allocated to mobile stations assigned to the category based on the resource allocation scheme associated with the category.

8 Claims, 3 Drawing Sheets

SYSTEMS AND METHODS OF CATEGORIZED ALLOCATION OF RADIO RESOURCES

BACKGROUND OF THE INVENTION

In wireless communication systems radio frequency resources are allocated for communication between base stations and mobile stations. Due to a number of factors, such as governmental allocation of frequencies, interference and the like, there are a limited number of radio frequency resources to allocate for wireless communications. Thus, allocation of radio frequency resources requires careful consideration of a large number of factors, and any particular allocation technique will have drawbacks with regard to other allocation techniques.

FIG. 1 illustrates a WiMAX wireless communication system implementing one resource allocation technique. This system includes a base station 105 and two mobile stations 110 and 115. In the exemplary WiMAX system, resources (e.g., sub-channels, time slots and modulation and coding schemes (MCSs)) are allocated on the basis of signal quality measurements (e.g., carrier-to-interference noise ratio (CINR)), where more resources are allocated to mobile stations that have better signal quality conditions than mobile stations with worse conditions. This typically results in mobile stations that are located closer to base station 105 being allocated more resources than mobile stations located further away from the base station. In this technique the base station includes a scheduler to allocate the resources, and this allocation technique is referred to as proportional fair scheduling.

SUMMARY OF THE INVENTION

Exemplary systems and methods of allocating radio resources are provided. The systems and methods involve assigning each of a plurality of mobile stations to one of a plurality of categories, wherein each of the plurality of categories is associated with a different resource allocation scheme. An amount of available radio resources is allocated to each of the plurality of categories. An amount radio resources assigned to each category is allocated to mobile stations assigned to the category based on the resource allocation scheme associated with the category.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
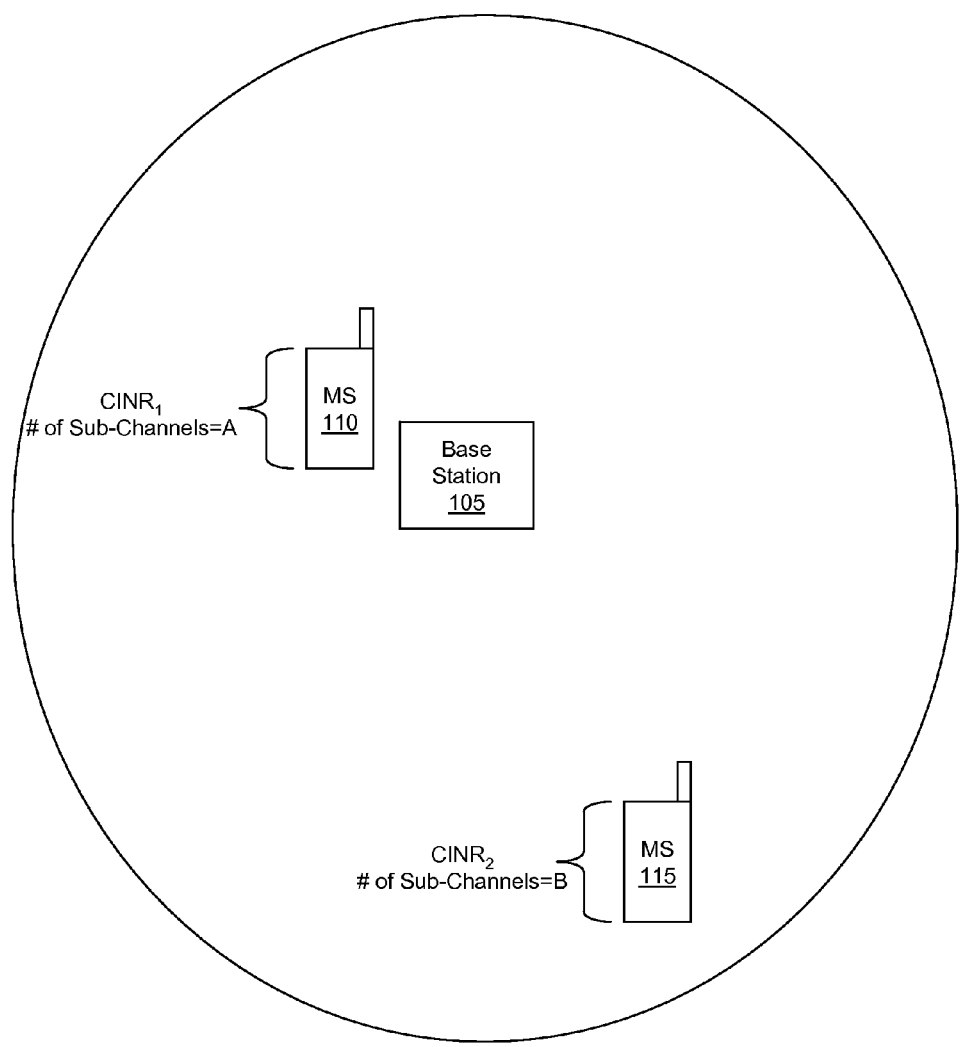
FIG. 1 is a block diagram of a conventional wireless communication system.
Figure 2:
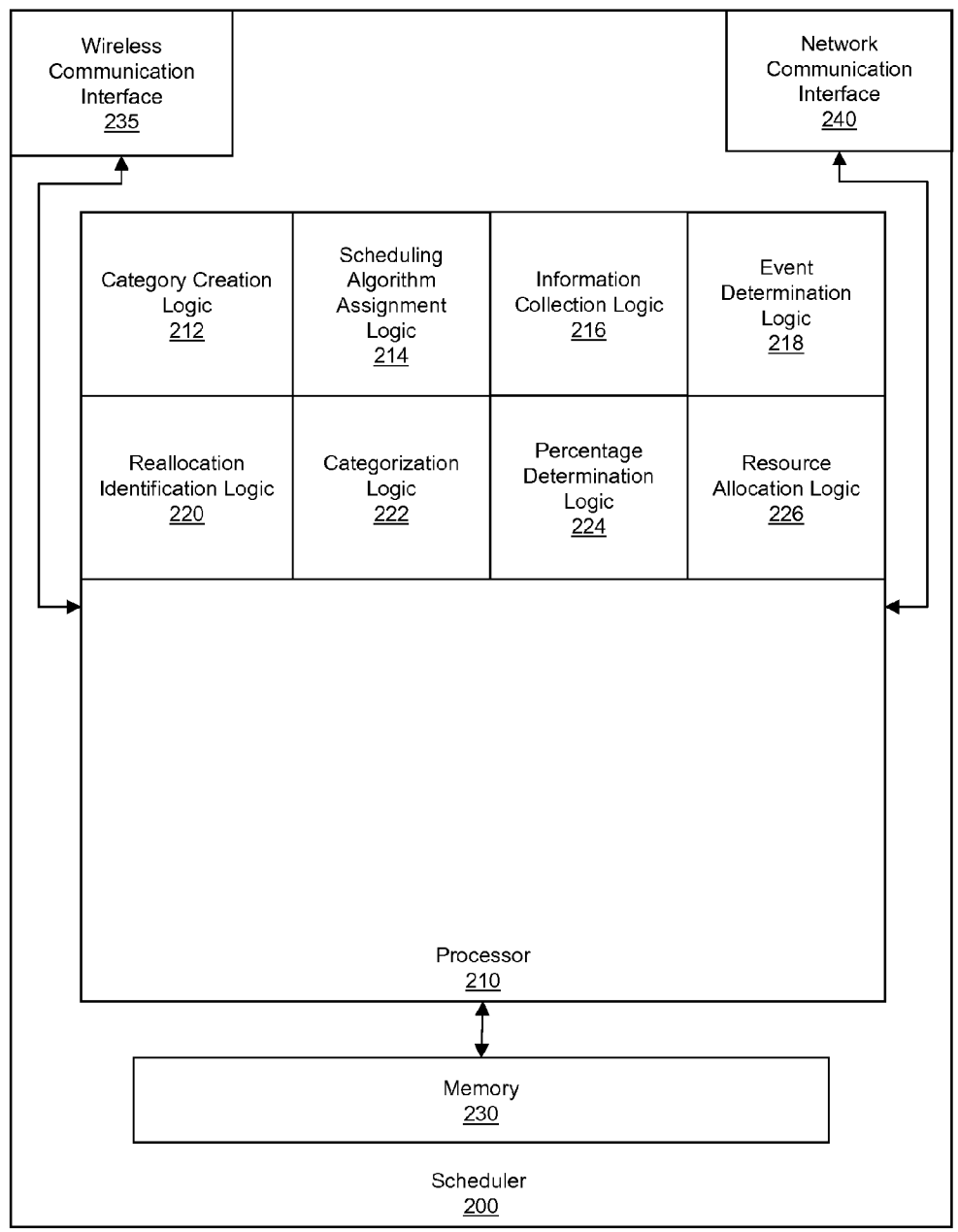
FIG. 2 is a block diagram of an exemplary scheduler in accordance with the present invention.

FIG. 2 is a block diagram of an exemplary scheduler in accordance with the present invention. Scheduler 200 includes processor 210 coupled to memory 230, wireless communication interface 235 and network communication interface 240. Processor 210 includes logic 212-226, which will be described in more detail below in connection with FIG. 3. Processor 210 can be any type of processor, such as a microprocessor, field programmable gate array (FPGA) and/or an application specific integrated circuit (ASIC). When processor 205 is a microprocessor then logic 212-226 can be processor-executable code loaded from memory 250.

Scheduler 200 can be a component of a base station or can be a separate network component. When scheduler 200 is a separate network component, wireless communication interface 235 can be omitted. Wireless communication interface 235 is employed for communicating with mobile stations over an air interface. Network communication interface 240 is employed for communication with infrastructure components of the network. When scheduler 200 is not a component of a base station, network communication interface can be used to provide the resource allocation to one or more base stations. Furthermore, when scheduler 200 is a component of a base station, processor 210 can be part of a base station processor and/or memory 230 can be part of the base station memory.

As will be described in more detail below, scheduler 200 allocates radio resources to one or more mobile stations. The resources allocated by the present invention can include uplink and/or downlink resources. The resources can include transmission power, modulation and coding scheme (MCS), number of codes or tones, time slots and/or the like.

Figure 3:
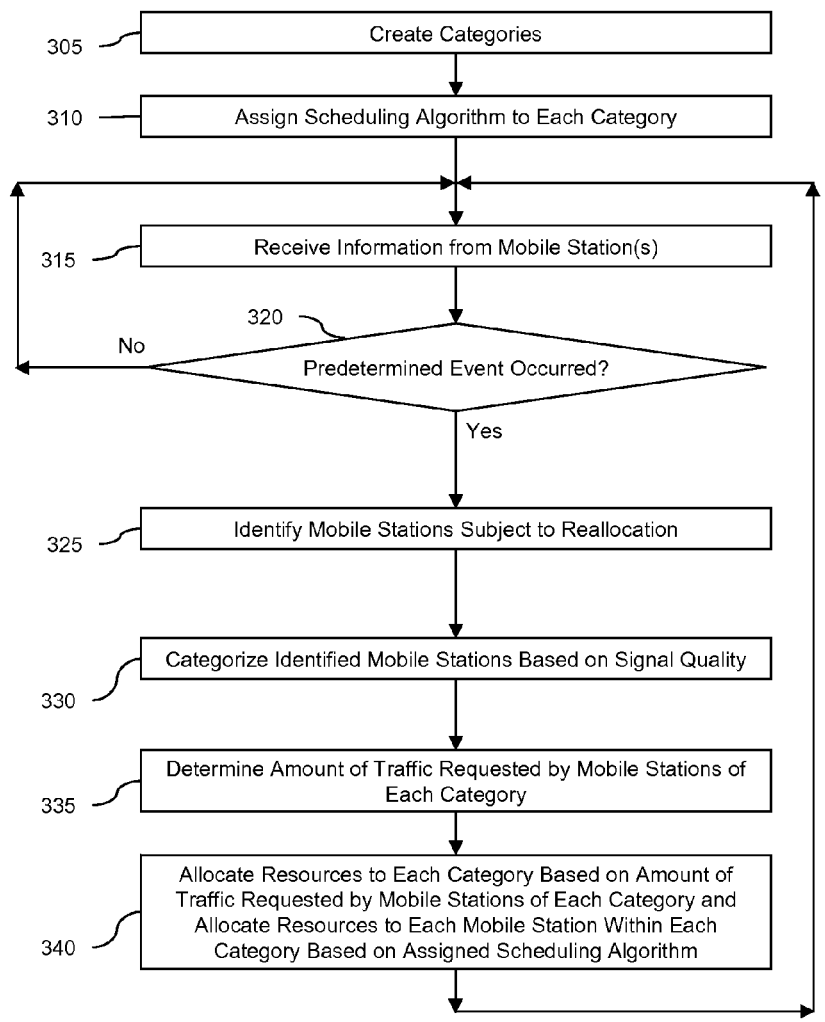
FIG. 3 is a flow diagram of an exemplary method in accordance with the present invention.

FIG. 3 is a flow diagram of an exemplary method in accordance with the present invention. Initially, logic 212 creates categories that will be used to categorize the mobile stations (step 305). Logic 214 then assigns a scheduling algorithm to each of the categories (step 310). Although FIG. 3 illustrates these two steps as not being repeated, if desired these steps can be performed on a periodic basis.

Each of the categories can be assigned to a particular signal quality measurement range, such as a range of carrier to interference-plus-noise ratio (CINR) values. Category 1 can be for mobile stations with a CINR above 22 dB, category 2 can be for mobile stations with a CINR between 12 and 21 dB, and category 3 can be for mobile stations with a CINR below 13 dB. In this example, category 1 can be assigned a throughput driven scheduling algorithm that allocates resources to users in the best radio frequency (RF) conditions, which results in the best sector throughput. Category 2 can be assigned a proportional fairness scheduling algorithm that considers both fairness and throughput. Category 3 can be assigned a round-robin scheduling algorithm that promotes fairness among all mobile stations at the expense of a lower overall sector throughput. Although this example includes specific ranges of signal quality values and types of scheduling algorithms, the present invention is equally applicable to other ranges and other types of, and assignments of, scheduling algorithms. Furthermore, the present invention can employ more or less than three categories and scheduling algorithms.

Logic 216 then collects information from mobile stations (step 315). This information can include signal quality measurements (such as CINR, received signal strength indications (RSSI) and/or the like), speed, location (e.g., geographical coordinates and/or elevation) and/or amount of traffic requested by the mobile station. Logic 218 then determines whether a predetermined event has occurred (step 320). The predetermined event can be the passage of a predetermined amount of time, e.g., the time corresponding to one uplink and downlink transmission period, such as a frame. When the predetermined event has not occurred ("No" path out of decision step 320), then logic 216 continues to collect information from the mobile stations.

When the predetermined event has occurred ("Yes" path out of decision step 320), then logic 220 identifies mobile stations subject to reallocation based on the speed and/or location information (step 325). For example, a mobile station that moves very slowly, is stationary or located within a building, may not necessarily require reallocation of resources with the same frequency as other mobile stations, e.g., on a frame-by-frame basis. Accordingly, these mobile stations could have their resources reallocated, for example, every four frames. Although not illustrated, if no mobile stations are subject to reallocation, then method would return to step 315 to receive information from the mobile stations.

Logic 222 then categorizes the identified mobile stations based on signal quality measurements (step 330), and logic 224 determines a percentage of the total available resources for allocation to each category (step 335). The percentage of resources is based on an amount of traffic requested for transmission to/or from mobile stations within each category compared to the total amount of available resources. Although not illustrated, if amount of traffic requested by all of the mobile stations cannot be satisfied by the amount of available resources, the scheduler can then allocate the available resources on the basis of the percentage of requested traffic to the total available resources, based on Quality of Service (QoS) requirements of each category, and/or the like. Logic 226 then allocates resources to each category based on a percentage of resources assigned to the category and resources to each mobile station within the category based on the assigned scheduling algorithm for that category (step 340). The method then returns to step 315 to receive information from mobile stations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of allocating radio resources, the method comprising the acts of:
receiving information from the plurality of mobile stations, wherein the received information comprises signal quality measurements, a mobile station speed and a mobile station location;
assigning each of a plurality of mobile stations to one of a plurality of categories based on the signal quality measurements, wherein each of the plurality of categories is associated with a different resource allocation scheme;
allocating a percentage of available radio resources to each of the plurality of categories based on an amount of traffic requested by each of the plurality of mobile stations within each category, wherein when an amount of traffic requested by the plurality of mobile stations cannot be satisfied by the amount of available resources, allocating available radio resources based on a percentage of requested traffic to the available radio resources and a quality of service requirement of each category;
allocating an amount of radio resources assigned to each category to mobile stations assigned to the category based on the resource allocation scheme associated with the category; and
selecting at least one of the plurality of mobile stations for reallocation of an amount of radio resources based on the received information, wherein when one of the mobile station speed meets a speed threshold and a change in the mobile station location meets a location change threshold the at least one of the plurality of mobile stations is selected for reallocation after a plurality of time periods comprising one uplink transmission period and one downlink transmission period.

2. The method of claim 1, wherein mobile stations are selected for reallocation have a predetermined speed or location.

3. The method of claim 1, wherein the different resource allocation schemes include a round-robin allocation scheme, throughput-driven allocation scheme and a proportional fairness allocation scheme.

4. A radio resources scheduler, comprising:
a memory; and
a processor coupled to the memory, the processor comprising
logic that receives information from the plurality of mobile stations, wherein the received information comprises signal quality information, a mobile station speed and a mobile station location;
logic that assigns each of a plurality of mobile stations to one of a plurality of categories based on the signal quality information, wherein each of the plurality of categories is associated with a different resource allocation scheme;
logic that determines, based on an amount of traffic requested for each of the plurality of categories, a percentage of the total amount of available resources allocated to each of the categories;
logic that allocates an amount of available radio resources to each of the plurality of categories based on the determined percentage of the total amount of available resources, wherein when an amount of traffic requested by the plurality of mobile stations cannot be satisfied by the amount of available resources, available radio resources are allocated based on a percentage of requested traffic to the available radio resources and a quality of service requirement of each category;
logic that allocates an amount radio resources assigned to each category to mobile stations assigned to the category based on the resource allocation scheme associated with the category; and
logic which selects at least one of the plurality of mobile stations for reallocation of an amount of radio resources based on the received information, wherein when one of the mobile station speed meets a speed threshold and a change in the mobile station location meets a location change threshold the at least one of the plurality of mobile stations is selected for reallocation after a plurality of time periods comprising one uplink transmission period and one downlink transmission period.

5. The radio resources scheduler of claim 4, wherein the different resource allocation schemes include a round-robin allocation scheme, throughput-driven allocation scheme and a proportional fairness allocation scheme.

6. The radio resources scheduler of claim 4, wherein the scheduler is a component of a base station.

7. The radio resources scheduler of claim 4, wherein the scheduler is a network element coupled to a base station.

8. A method of allocating radio resources, the method comprising the acts of:
receiving information from the plurality of mobile stations, wherein the received information comprises signal quality measurements, a mobile station speed, and geographical coordinates of the mobile station;

assigning each of a plurality of mobile stations to one of a plurality of categories based on the signal quality measurements, wherein each of the plurality of categories is associated with a different scheduling algorithm;

allocating an amount of available radio resources to each of the plurality of categories; and allocating a percentage of available radio resources to each of the plurality of categories based on an amount of traffic requested by each of the plurality of mobile stations within each category, wherein when an amount of traffic requested by the plurality of mobile stations cannot be satisfied by the amount of available resources, allocating available radio resources based on a percentage of requested traffic to the available radio resources and a quality of service requirement of each category.

* * * * *